United States Patent
Hotta et al.

(10) Patent No.: US 7,731,227 B2
(45) Date of Patent: Jun. 8, 2010

(54) HEAD PROTECTION AIRBAG DEVICE

(75) Inventors: Naoki Hotta, Aichi-ken (JP); Yasuo Ochiai, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 247 days.

(21) Appl. No.: 12/076,865

(22) Filed: Mar. 25, 2008

(65) Prior Publication Data

US 2008/0238055 A1 Oct. 2, 2008

(30) Foreign Application Priority Data

Apr. 2, 2007 (JP) ............................. 2007-096808

(51) Int. Cl.
*B60R 21/213* (2006.01)
(52) U.S. Cl. .................................. 280/730.2
(58) Field of Classification Search ............... 280/730.2
See application file for complete search history.

(56) References Cited

U.S. PATENT DOCUMENTS

| | | | | |
|---|---|---|---|---|
| 7,264,269 | B2 * | 9/2007 | Gu et al. .................. | 280/730.2 |
| 7,278,655 | B2 * | 10/2007 | Inoue et al. .............. | 280/730.2 |
| 7,434,831 | B2 * | 10/2008 | Noguchi et al. .......... | 280/730.2 |
| 7,618,057 | B2 * | 11/2009 | Pinsenschaum et al. .. | 280/730.2 |
| 2005/0082797 | A1 * | 4/2005 | Welford et al. ........... | 280/730.2 |
| 2007/0001433 | A1 * | 1/2007 | Gu et al. .................... | 280/729 |
| 2007/0205589 | A1 * | 9/2007 | Enriquez et al. ......... | 280/730.2 |
| 2008/0054606 | A1 * | 3/2008 | Mitsuo et al. ............ | 280/730.2 |
| 2008/0084052 | A1 * | 4/2008 | Abney et al. ............. | 280/730.2 |
| 2009/0014989 | A1 * | 1/2009 | Henderson et al. ....... | 280/730.2 |
| 2009/0283992 | A1 * | 11/2009 | Sugimori et al. ......... | 280/730.2 |

FOREIGN PATENT DOCUMENTS

JP  A-2003-54347  2/2003

* cited by examiner

*Primary Examiner*—Paul N Dickson
*Assistant Examiner*—Nicole Verley
(74) *Attorney, Agent, or Firm*—Posz Law Group, PLC

(57) ABSTRACT

In a head protection airbag device according to the invention, non-inflating portions of an airbag includes a blocking portion which covers the vehicle interior side of windows when inflation of the airbag is completed. One blocking portion includes a downward movement inhibiting portion catching a passenger's head and inhibiting its downward movement when the head moves downward while moving toward the vehicle exterior and touches the blocking portion when inflation of the airbag is completed. The blocking portion comprises overlapping vehicle interior side and the vehicle exterior side portions which are mutually connected, with a portion of a vehicle interior member by the upper edge made to be the downward movement inhibiting portion. The downward movement inhibiting portion is connected at both the front and rear edges to the vehicle exterior member of the blocking portion, allowing the upper edge of the downward movement inhibiting portion to be a catching edge which can be separated from the vehicle exterior member when catching the head.

6 Claims, 14 Drawing Sheets

HEAD PROTECTION AIRBAG DEVICE

The present application claims priority from Japanese Patent Application No. 2007-096808 of Hotta et al., filed on Apr. 2, 2007, the disclosure of which is hereby incorporated into the present application by reference.

BACKGROUND OF THE INVENTION

1. Field of the Invention

The invention relates to a head protection airbag device having a configuration including an airbag which is folded and housed by the upper edge of a window in the vehicle interior side, which is fixed to the vehicle body at its upper edge, and which deploys and inflates so as to cover the vehicle interior side of the window while projecting downward from its housed position by allowing inflation gas from an inflator to flow therein.

2. Description of the Related Art

Conventionally, a head protection airbag device is like the one shown in JP-A-2003-54347. In the conventional head protection airbag device, an airbag includes an inflating portion inflating by allowing inflation gas to flow therein and a non-inflating portion into which inflation gas does not flow. In the conventional device, the area of the airbag which covers the vehicle interior side of the window when inflation is completed in the airbag includes the inflating portion and the non-inflating portion. This is for inhibiting the capacity of the airbag from increasing as much as possible while still securing protection of a passenger's head. Specifically, in the conventional head protection airbag device, the area of the airbag which covers the vehicle interior side when inflation is completed includes a head protection portion which is the inflating portion and a blocking portion which is the non-inflating portion. The head protection portion is a portion provided at the side of a seat, inflating by allowing inflation gas to flow therein so as to protect the passenger's head. The blocking portion is a portion which covers the vehicle interior side of the window, having a configuration in which inflation gas does not flow therein. Moreover, in the conventional head protection airbag device, a tension belt which is separated from the airbag is arranged at the portion of the blocking portion, this tension belt generating tension along the front-rear direction at the lower edge side of the airbag when inflation is completed. This is for preventing the passenger's head from moving greatly downward to under the lower edge of the blocking portion even when the passenger's head moves towards the vehicle exterior side as well as moving downward while abutting on the blocking portion.

However, in the conventional head protection airbag device, through the airbag has a configuration such that in completing inflation it generates tension along the front-rear direction at the lower edge side, but such that the area of the blocking portion formed by the non-inflating portion is thinner than the head protection portion which inflates by allowing inflation gas to flow therein. Therefore, when the airbag completes the inflation in a state in which a large tension is not generated at the lower edge side, the lower edge of the blocking portion tends to get closer to the window than the lower edge of the head protection potion. Also, the lower edge of the blocking portion easily climbs over the lower edge of the window. As a result, it is difficult for the conventional head protection airbag device to reliably prevent movement of the head of the passenger in the downward direction when the head abuts on the inflated airbag. In the conventional head protection airbag device, a tension belt which is separate from the airbag is inserted through a center portion of the blocking portion, the respective ends of the tension belt being connected to the vehicle interior side and the vehicle exterior side of the blocking portion. Therefore, if the head of the passenger abuts on the tension belt from above while abutting on the blocking portion of the airbag at the completion of inflation, the tension belt greatly departs from the blocking portion, pulling the portion arranged at the vehicle exterior side into the vehicle interior side. As a result, in the conventional head protection airbag device, it is difficult for the head to catch smoothly on the tension belt, and there is room for improvement of this device, to reliably prevent the downward movement of the passenger's head.

SUMMARY OF THE INVENTION

An object of the invention is to provide a head protection airbag device capable of preventing a passenger's head from moving downward by arresting the head reliably even at an area of a blocking portion into which inflation gas does not flow.

The object of the invention can be achieved by a head protection airbag device having the following configuration.

An airbag folded and housed at an upper edge side of windows in the vehicle interior side and an inflator supplying inflation gas to the airbag are included, and the airbag is fixed to a vehicle body at its upper edge side and deploys and inflates so as to cover the vehicle interior side of the windows while projecting downward from its housed position by allowing inflation gas from the inflator to flow therein. The airbag includes an inflating portion inflating by allowing inflation gas to flow therein and a non-inflating portion into which the inflation gas does not flow, the inflating portion includes plural head protection portions which are arranged along the front-rear direction at the side of the seat protect a passenger's head when inflation is completed, the non-inflating portion includes a blocking portion arranged from the lower edge side to the upper edge side of the airbag between the head protection portions. The blocking portion covers the vehicle interior side of the windows at the completion of inflation of the airbag. A downward movement inhibiting portion is formed at the blocking portion which catches the head of the passenger and prevents downward movement of the head when the head moves downward while moving toward the vehicle exterior and touches the blocking portion at the time of the completion of inflation. The blocking portion is formed from sheets of flexible material at the vehicle interior side and the vehicle exterior side overlapping and connecting with each other, making an upper edge-facing portion of a member arranged at the vehicle interior side the downward movement inhibiting portion. Both front and rear edge sides of the downward movement inhibiting portion are connected to a vehicle exterior member arranged at the vehicle exterior side of the blocking portion. The downward movement inhibiting portion is arranged at a position higher than the lower edge of the window but lower than the center of the airbag in the up-down direction when inflation of the airbag is completed, and the upper edge side of the downward movement inhibiting portion is made to be a catching edge which can be separated from the side of the vehicle exterior member at the time the head becomes engaged.

In the head protection airbag device according to the invention, the downward movement inhibiting portion catches the head and inhibits the downward movement of the head when the head of the passenger moves downward and toward the vehicle exterior and touches the blocking portion in the airbag at the time of the completion of inflation. The downward movement inhibiting portion catches the passenger's head when the head moves downward while abutting on the blocking portion of the inflated airbag by separating the catching edge arranged at the upper edge of the downward movement inhibiting portion from a vehicle exterior member. Therefore, according to the head protection airbag device of the invention, it is possible to catch the passenger's head abutting on the blocking portion by the catching edge of the downward movement inhibiting portion and prevent the head's downward movement. In the head protection airbag device according to the invention, the downward movement inhibiting portion is arranged at a position higher than the lower edge of the window but lower than the center of the airbag in the up-down direction when inflation of the airbag is completed. Therefore, the downward movement inhibiting portion will be at a position lower than the head when the passenger's head abuts on the blocking portion when inflation of the airbag is completed, thereby reliably catching the passenger's head and preventing the downward movement of the head.

Accordingly, in the head protection airbag device of the invention, it is possible to arrest the passenger's head reliably and to prevent the head from moving downward even at the blocking portion into which inflation gas does not flow.

In the head protection airbag device of the invention, it is preferable that the airbag is manufactured by a hollow weave and has a configuration in which a portion of the non-inflating portion forming the blocking portion is cut out so as to be used for another member, the cutout portion cut out from the non-inflating portion is covered by a separate member formed from a flexible sheet material which is connected to the periphery of the cutout portion. This separate member preferably comprises a vehicle exterior portion forming the vehicle exterior member and a vehicle interior portion forming the vehicle interior member.

In the head protection airbag device having the above configuration, one portion of the blocking portion can be cut out and used for another member, and therefore, another member such as an inner tube arranged at a gas-inflow port of the airbag can be manufactured at the same time as the airbag. The covering member covering the cutout member can be formed from non-coated cloth, and therefore, manufacturing cost of the airbag can be reduced.

In the head protection airbag device having the above configuration, the covering member can be arranged so as to cover the vehicle interior side or the vehicle exterior side of the cutout portion. In the case of the covering member is arranged so as to cover the vehicle interior side of the cutout portion, the covering member is set to have large outside dimensions which cover more than the cutout portion. In this case, the downward movement inhibiting portion can be formed from the vehicle interior portion of the covering member, regardless of change of the size of the cutout portion accompanying design change. Therefore, it is preferable to arrange the covering member so as to cover the vehicle interior side of the cutout potion.

Moreover, in the head protection airbag device having the above configuration, it is preferable that the lower edge side positioned below the catching edge in the vehicle interior member which forms the downward movement inhibiting portion is connected to the vehicle exterior member. In the head protection airbag device having the above configuration, when the passenger's head abuts on the downward movement inhibiting portion from above while abutting on the blocking portion, the catching edge will move downward while bulging down to the vehicle interior side. Then, the downward movement inhibiting portion opens towards the vehicle interior side. Accordingly, the vehicle interior side of the window can be sufficiently covered by the opened downward movement inhibiting portion, and therefore, the passenger's head can be suitably protected from the window at that time of rollover.

Furthermore, in the head protection airbag device having the above configuration, the lower edge side of the vehicle interior member may be separated from the vehicle exterior member. In the case of such configuration, the vehicle interior member is connected to the vehicle exterior member only at the front and rear edges. Therefore, it is possible to shorten the distance of the connection between the vehicle interior member and the vehicle exterior member, which can reduce manufacturing costs of the airbag.

Furthermore, in the head protection airbag device according to the invention, it is preferable that the airbag is manufactured by a hollow weave and that the portion of the non-inflating portion which forms the blocking portion is cut out so as to be used for another member, and that the downward movement inhibiting portion is formed from the portion of the lower edge side of the periphery of the cutout portion in the non-inflating portion.

In the head protection airbag device having the above configuration, the area of the blocking portion can be cut out to be used for another member. Therefore, another member such as an inner tube arranged at the gas-inflow port of the airbag can be manufactured at the same time, thereby reducing manufacturing costs of the airbag.

DESCRIPTION OF THE PREFERRED EMBODIMENTS

Hereinafter, an embodiment of the invention will be explained with reference to the drawings. However, the invention is not limited to the embodiments disclosed herein. All modifications within the appended claims and equivalents relative thereto are intended to be encompassed in the scope of the claims.

Figure 1:
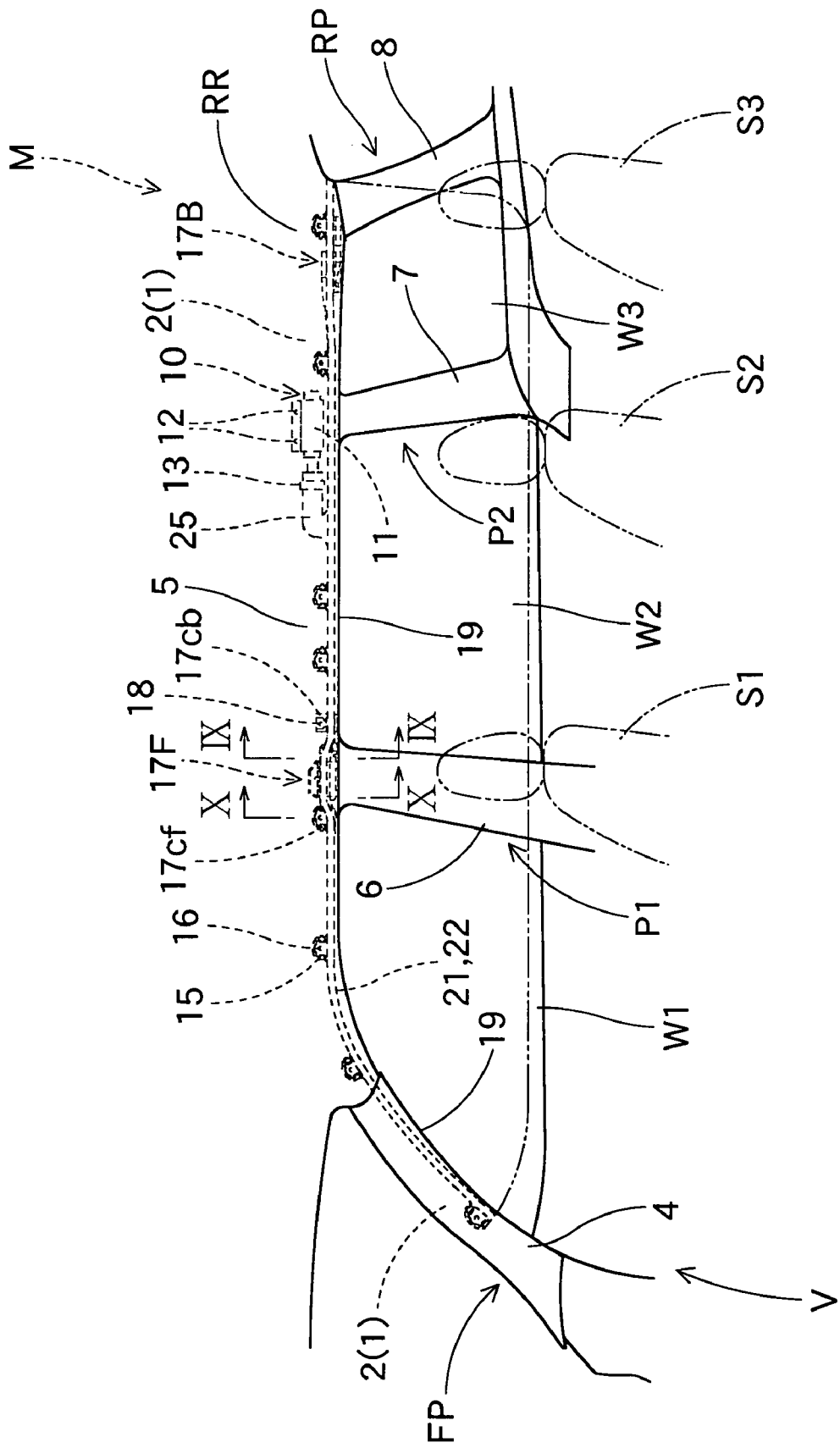
FIG. 1 is a schematic front view of a head protection airbag device according to an embodiment of the invention, seen from the vehicle interior.

A head protection airbag device (hereinafter, abbreviated to "airbag device") M is mounted on a vehicle V which is a three-row seating type including seats S1, S2 and S3 arranged in three rows in the front-rear direction as shown in FIG. 1. Specifically, the airbag device M according to the embodiment is mounted at a front-pillar portion FP, a roof side rail portion RR which are by the upper edge of windows (side windows) W1, W2 and W3, or a rear-pillar portion RP of the vehicle V. The airbag device M includes an airbag 21, an inflator 10, fixing brackets 11, 15, guide brackets 17F, 17B and an airbag cover 19.

Figure 9:
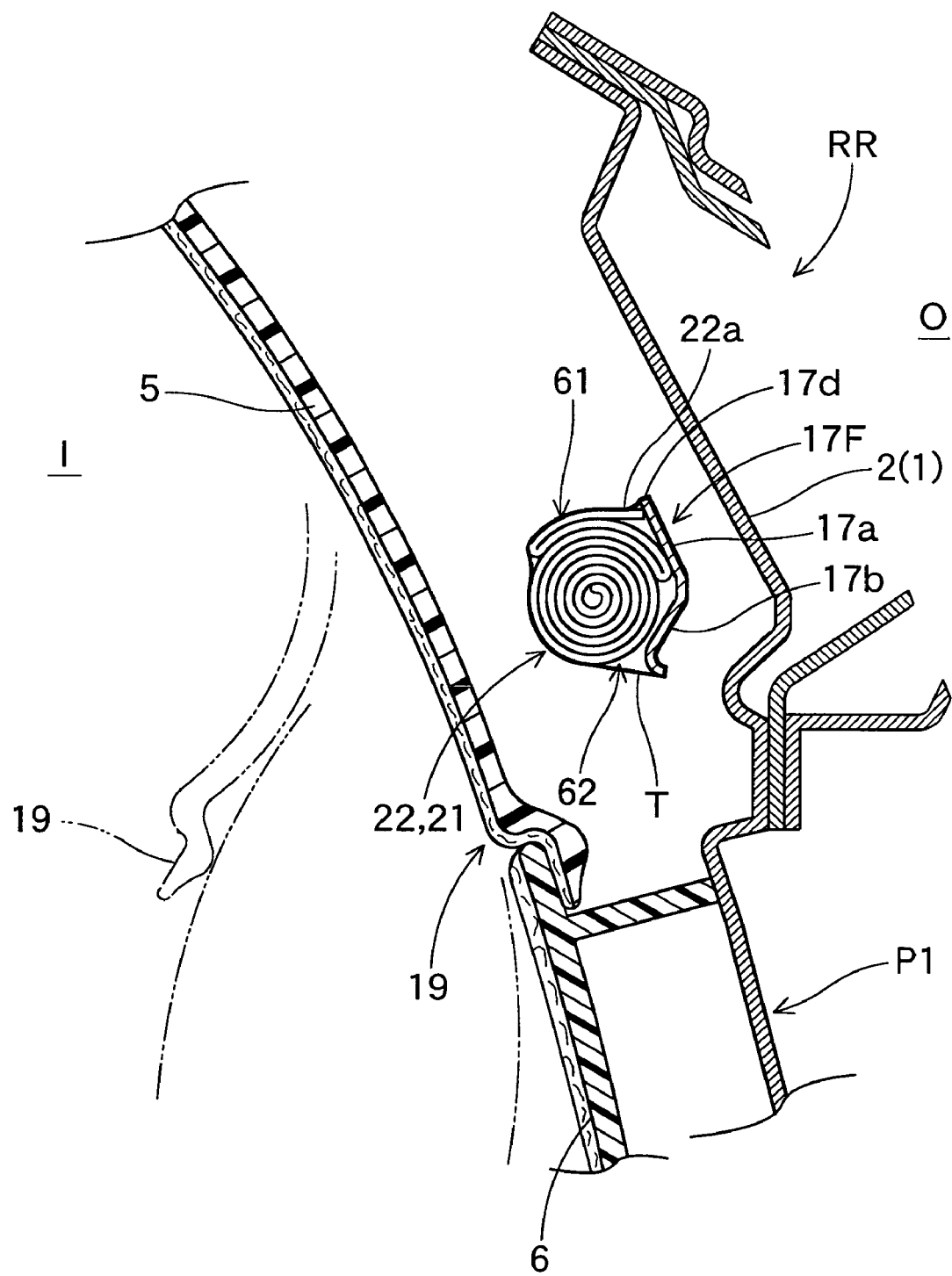
FIG. 9 is a cross-sectional view showing the head protection airbag device of the embodiment in a state of being mounted on a vehicle, along the line IX-IX in FIG. 1.
Figure 10:
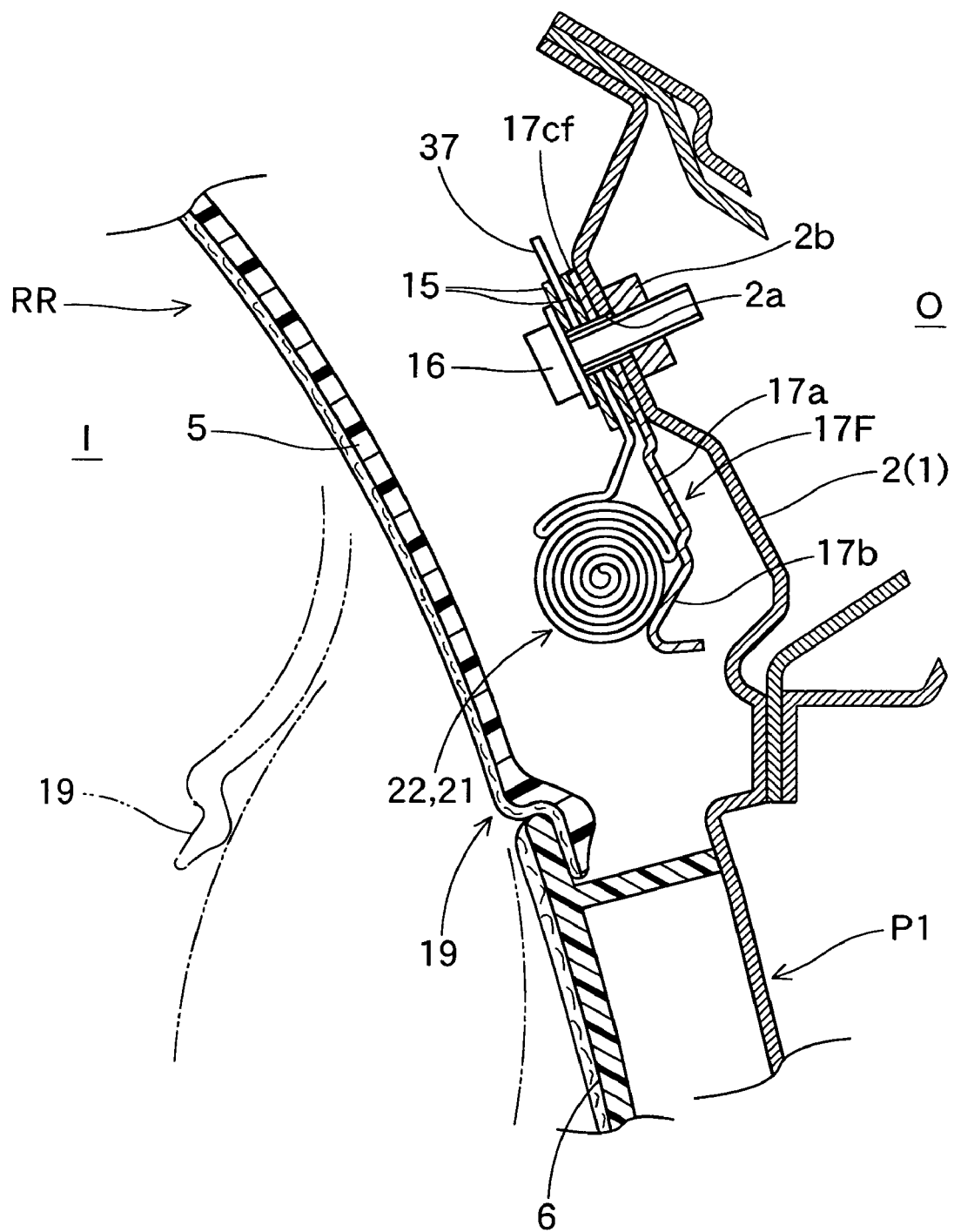
FIG. 10 is a cross-sectional view showing the head protection airbag device of the embodiment in a state of being mounted on a vehicle, along the line X-X in FIG. 1.

The airbag cover 19 comprises the lower edges of a pillar garnish 4 and a roof head lining 5 as shown in FIG. 1, FIG. 9 and FIG. 10. The pillar garnish 4 is arranged at the front-pillar portion FP. The roof head lining 5 is arranged at the roof side-rail portion RR. The airbag cover 19 is arranged so as to cover the airbag 21, which is folded and housed, on the vehicle interior side. The airbag cover 19 is also configured to be opened to the vehicle interior side, being pushed by the airbag 21 so that the airbag 21 can project into the vehicle interior side at the time of deploying and inflating.

The inflator 10 supplies inflation gas to the airbag 21, and so has a roughly columnar shape. At the tip of the inflator 10, a not-shown gas discharge port which can discharge inflation gas is formed. The tip of the inflator 10 including the vicinity of the gas discharge port is inserted into an inner tube 58 arranged in a later-described gas-inflow port 25 of the airbag 21. The inflator 10 is connected to the airbag 21 by a clamp 13 outfitted to the outside of the rear end 25a of the gas-inflow port 25. The inflator 10 is also installed in an inner panel 2 of a body 1 by fixing a fixing bracket 11 which holds the inflator 10 to the inner panel 2 with a bolt 12. Specifically, the inflator 10 is installed above a second intermediate pillar portion P2 in the inner panel 2 of the body 1 by using the fixing bracket 11.

Each fixing bracket 15 is formed by two plates made of sheet metal (refer to FIG. 10). Each fixing bracket 15 is fixed to a later-described fixing portion 37 of the airbag 21 so as to sandwich the fixing portion 37. Each fixing bracket 15 fixes each fixing portion 37 to the inner panel 2 along with a fixing bolt 16. Each fixing bolt 16 is fastened to a nut 2b fixed at a rim of a fixing hole 2a formed in the inner panel 2.

The guide brackets 17F, 17B are arranged at positions above a first intermediate pillar portion P1 and the rear pillar portion RP respectively as shown in FIG. 1. The guide brackets 17F, 17B are for controlling the projection direction of the folded and housed airbag 21 at the time of deploying and inflating. The guide brackets 17F, 17B have a rough L-shape in cross-section which covers the area to the vehicle exterior side "O" of the folded airbag 21 and also the area below.

Figure 8:
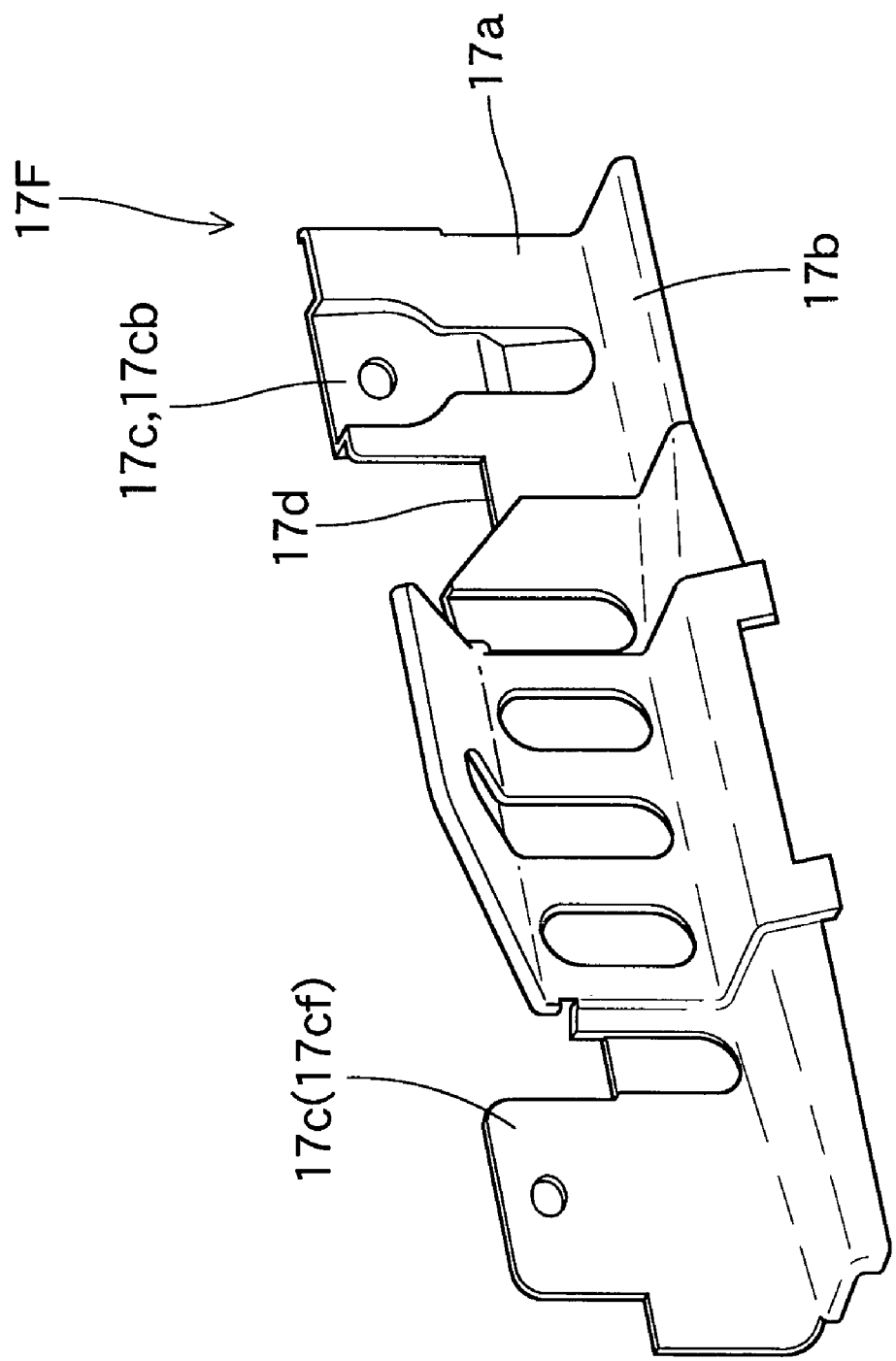
FIG. 8 is a perspective view of a guide bracket used in the head protection airbag device of the embodiment.

Specifically, the guide brackets 17F, 17B are for preventing the airbag 21 from deploying so as to intrude into the vehicle exterior side of the pillar garnishes 6, 8 arranged at the vehicle interior side "I" of the first intermediate pillar portion P1 and the rear pillar portion RP, respectively, and for making the airbag 21 to project into the vehicle interior side of the pillar garnishes 6, 8. Taking the guide bracket 17F arranged above the first intermediate pillar portion P1 as an explanatory example, the guide bracket 17F includes a vertical wall portion 17a and a lateral wall portion 17b as shown in FIGS. 8 to 10. The vertical wall portion 17a is arranged on the vehicle exterior side "O" of the folded airbag 21. The lateral wall portion 17b is arranged below the folded airbag 21. At both the vehicular rear and front sides of the guide brackets 17F, fixing piece portions 17c, 17c extending upward from an upper edge 17d of the vertical wall portion 17a are formed. The fixing piece portion 17cf at the front side is fixed to the inner panel 2 together with the fixing portion 37 and the fixing bracket 15 of the airbag 21 by using the fixing bolt 16. The fixing piece portion 17cb arranged at the rear side is fixed on the inner panel 2 by using a bolt 18 (refer to FIG. 1).

Figure 11:
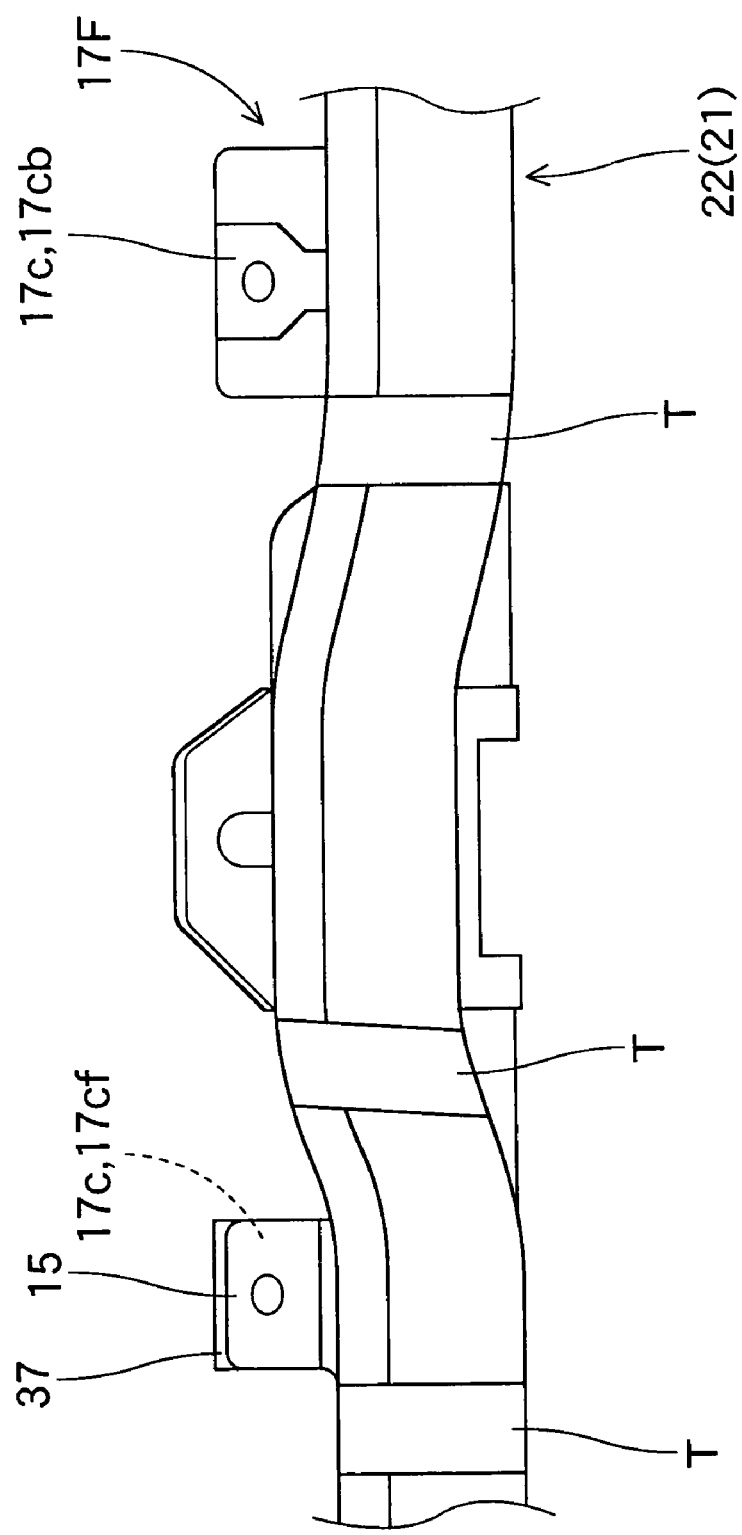
FIG. 11 is a partially-enlarged front elevation view showing a state of the guide bracket assembled on the folded airbag in the head protection airbag device of the embodiment.

In the embodiment, the airbag 21 is mounted on the vehicle and is integrally connected to the guide bracket 17F by a breakable tape material T for assembly which is wound around the periphery of the airbag. Specifically, in the case of the embodiment, the airbag 21 is integrally connected with the guide bracket 17F by the tape material T which is wound at three spots in the vehicular front-rear direction as shown in FIG. 11. In this case, an upper edge 22a in a later-described bag main body 22 of the airbag 21 is aligned with the upper end 17d of the vertical wall portion 17a of the guide bracket 17F (refer to FIG. 9). The airbag 21 is folded so that a first head protection portion 27, a second head protection portion 28, and a third head protection portion 31 arranged below a gas-supply route portion 24 as described later (refer to FIG. 9 and FIG. 10) are each rolled up. When this is done in the embodiment, the direction, the arrangement position and the like of a later-described roll-folding portion 62 of the airbag 21 with respect to the guide bracket 17F can be stable. This is because the airbag 21 is integrated with the guide bracket 17F so that the upper edge 22a of the folded airbag 21 is aligned with the upper edge 17d of the vertical wall portion 17a of the guide bracket 17F. As a result, at the beginning of the inflation of the airbag 21, the projecting direction of the airbag 21 can be stably controlled toward the vehicle interior by the guide bracket 17F. Though not shown, in addition the folded airbag 21 is integrally connected to the guide bracket 17B which is arranged above the rear pillar portion RP, by the tape material T. Accordingly, at the guide bracket 17B as well, the upper edge 22a of the bag main body 22 is aligned with the upper edge of the vertical wall portion of the guide bracket 17B.

The airbag 21 is housed in a folded state from the lower edge sides of the front pillar portion FP and the roof side rail portion RR which are at the upper edges of the windows W1, W2, and W3 at the vehicle interior side I of the vehicle V. The airbag 21 is deployed and inflated so as to cover the vehicle interior side of the respective windows W1, W2, and W3, the first intermediate pillar portion P1 and the second intermediate pillar portion P2, while deploying and projecting downward from the folded state by allowing the inflation gas from the inflator 10 to flow therein. The airbag 21 includes, in the case of the embodiment, the bag main body 22 and the inner tube 58 as shown in FIG. 2 to FIG. 6. The bag main body 22 is manufactured by a hollow weave using polyamide yarn or the like. The bag main body includes an inflating portion 23 and non-inflating portion 35. The inflating portion 23 is a portion which inflates by allowing inflation gas G from the inflator 10 to flow therein so as to separate a vehicle-interior wall 23a from a vehicle-exterior wall 23b. The non-inflating portion 35 is a portion configured not to allow the inflation gas to flow therein. In the case of the embodiment, the bag main body 22 has a coating agent such as silicon for preventing a gas leak, which is coated over almost the whole surface of the outer periphery after the weaving process.

In the case of the embodiment, the inflating portion 23 includes the gas-supply route portion 24, the gas-inflow port 25, the first head protection portion 27, the second head protection portion 28 and the third head protection portion 31. The first head protection portion 27, the second head protection portion 28 and the third head protection portion 31 are arranged side by side in the vehicular front-rear direction at the completion of inflation of the airbag 21.

Figure 2:
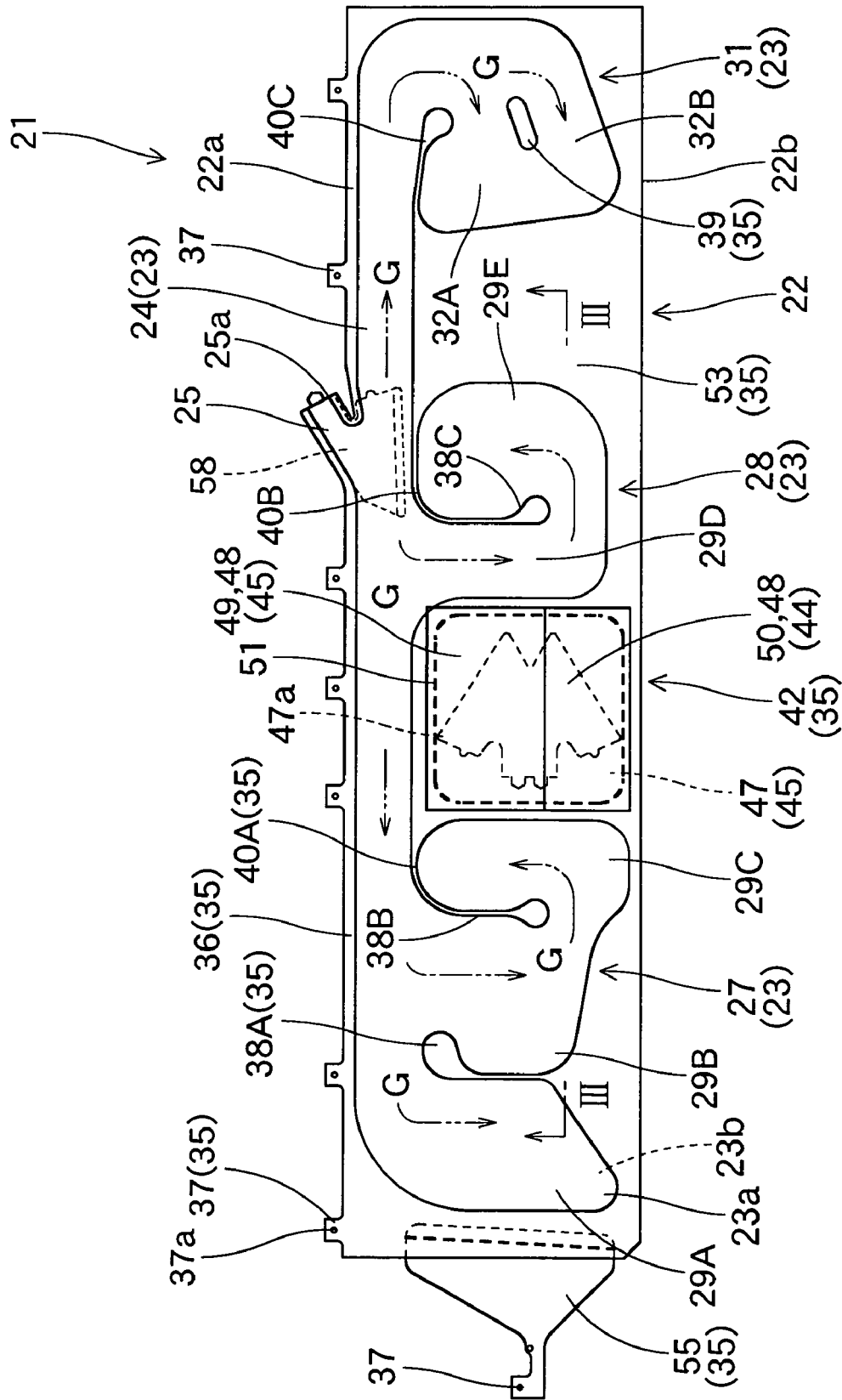
FIG. 2 is a front view showing an airbag used in the head protection airbag device of the embodiment, laid out in a flat state.
Figure 3:
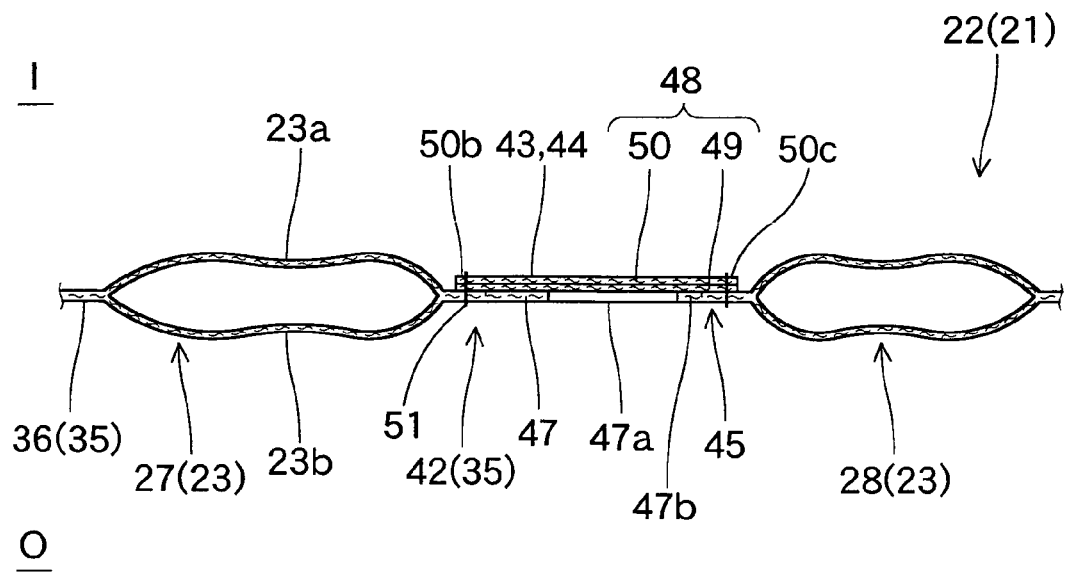
FIG. 3 is a schematic cross-sectional view showing the airbag of the embodiment at the time of inflation, along the line III-III in FIG. 2.
Figure 4:
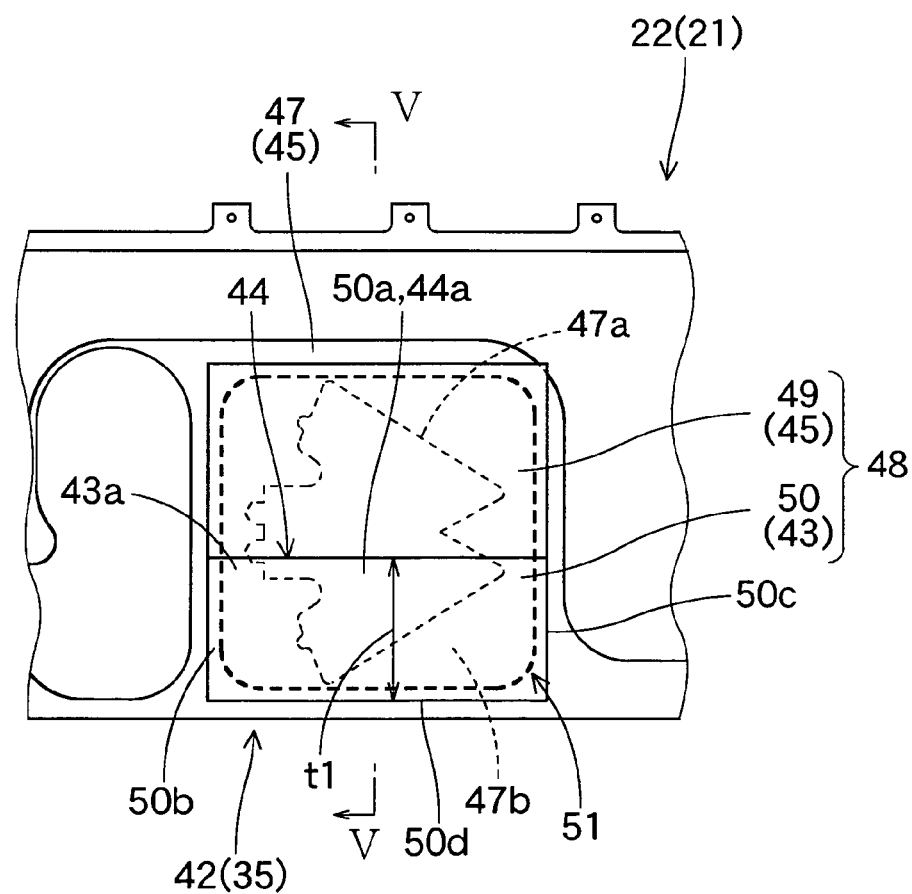
FIG. 4 is an enlarged plan view of a blocking portion of the airbag of the embodiment.
Figure 5:
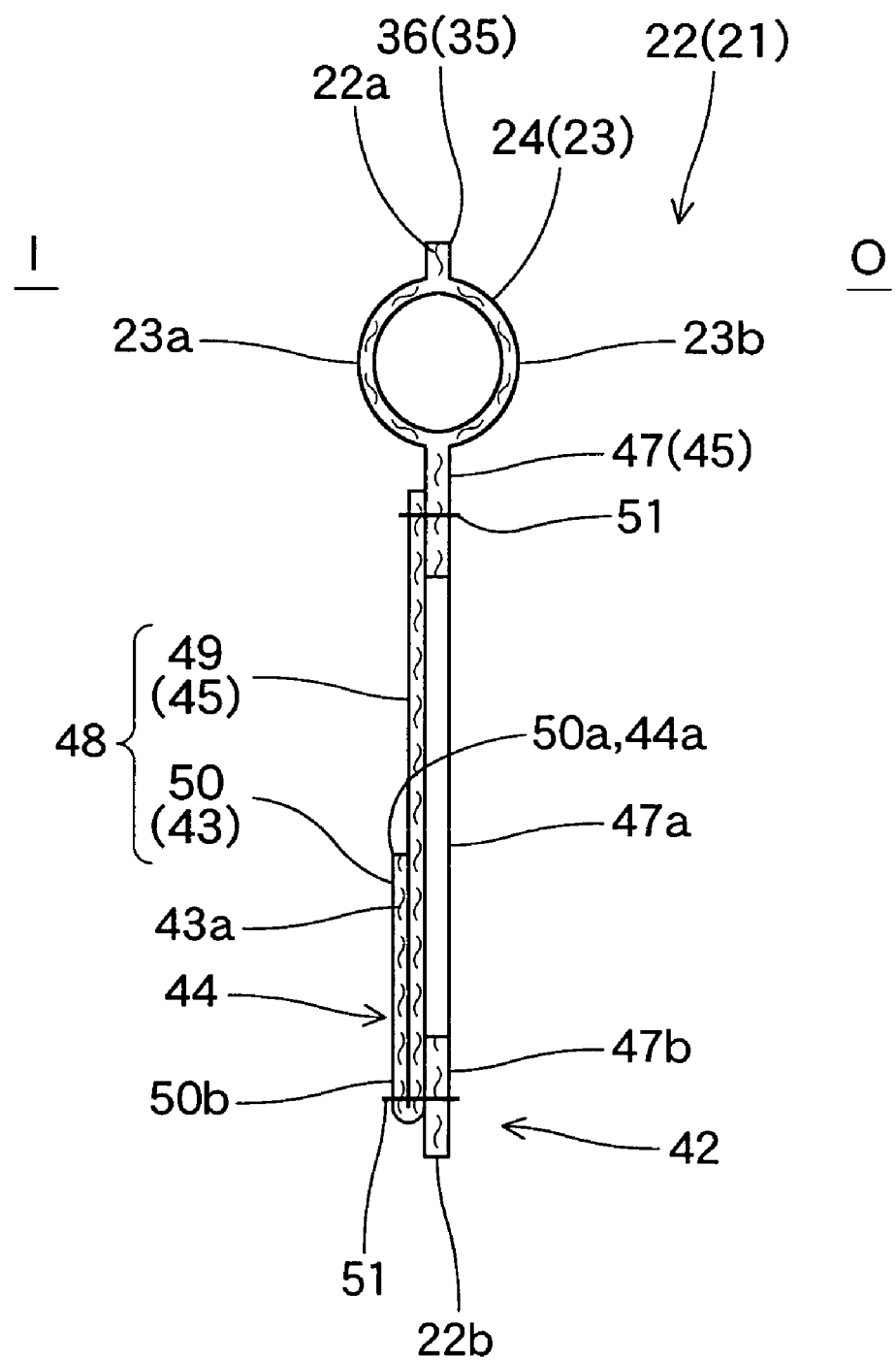
FIG. 5 is a schematic cross-sectional view along the line V-V in FIG. 4.
Figure 6:
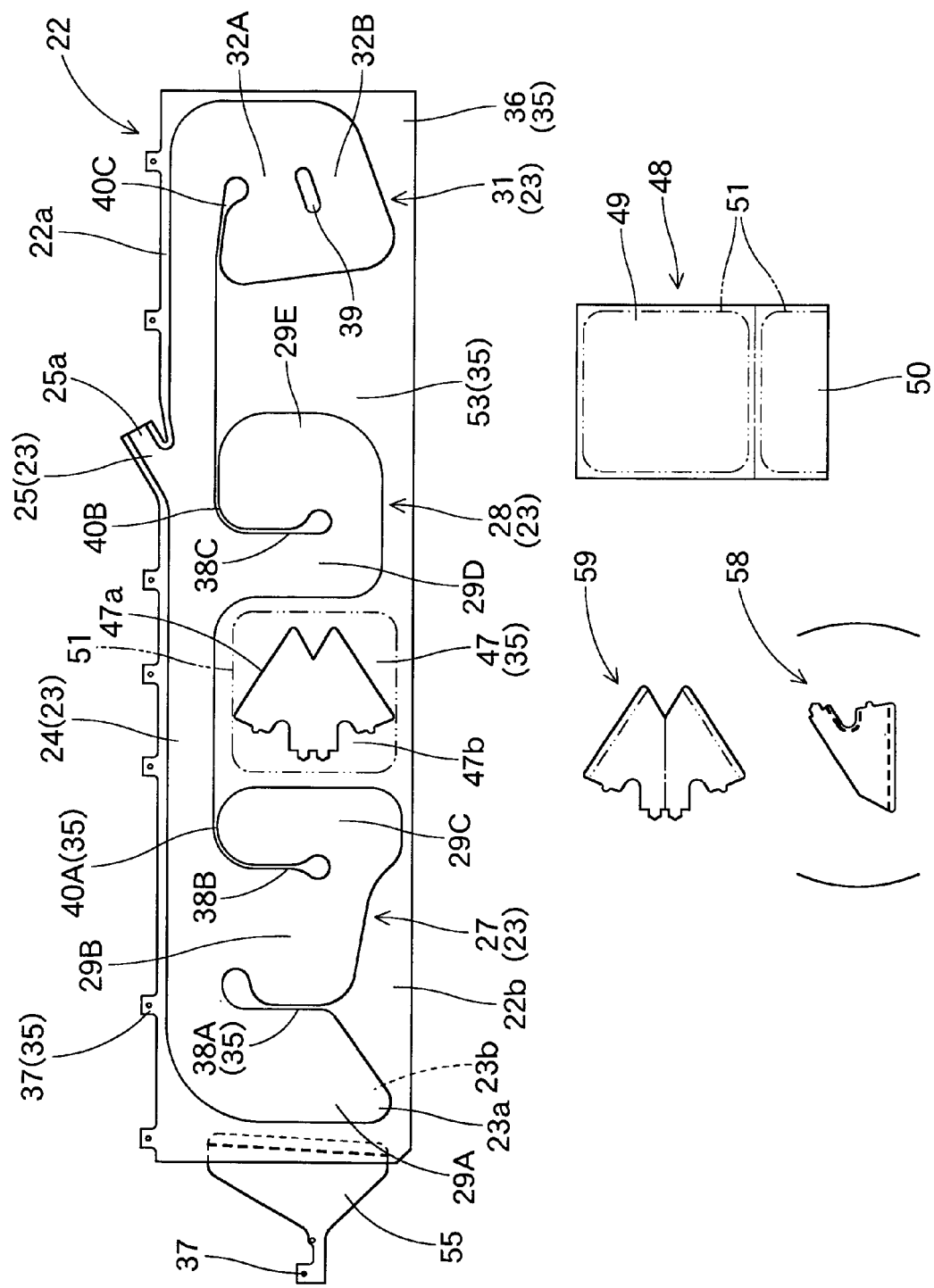
FIG. 6 is a front view showing the airbag of FIG. 2 disassembled into a bag main body, a covering member, and an inner tube member.

The gas-supply route portion 24 is formed along the front-rear direction of the vehicle V at the upper edge 22a of the bag main body 22 as shown in FIG. 2 and FIG. 6. The gas-supply route portion 24 is arranged over almost the whole longitudinal (front-rear) range of the bag main body 22. The gas-supply route portion 24 guides the inflation gas G discharged from the inflator 10 to the first head protection portion 27, the second head protection portion 28 and the third head protection portion 31 arranged below the gas-supply route portion 24. The gas-inflow port 25 is connected with the gas-supply route portion 24 so as to project upward from the gas-supply route portion 24 at the rear side of the center of the front-rear direction. The gas-inflow port 25 opens at the side of a rear end 25a in the embodiment. Then, the gas-inflow port 25 is outfitted with the inflator 10 through the inner tube 58 which is described later. The gas inflow port 25 is connected to the inflator 10 with a clamp 13.

Figure 12:
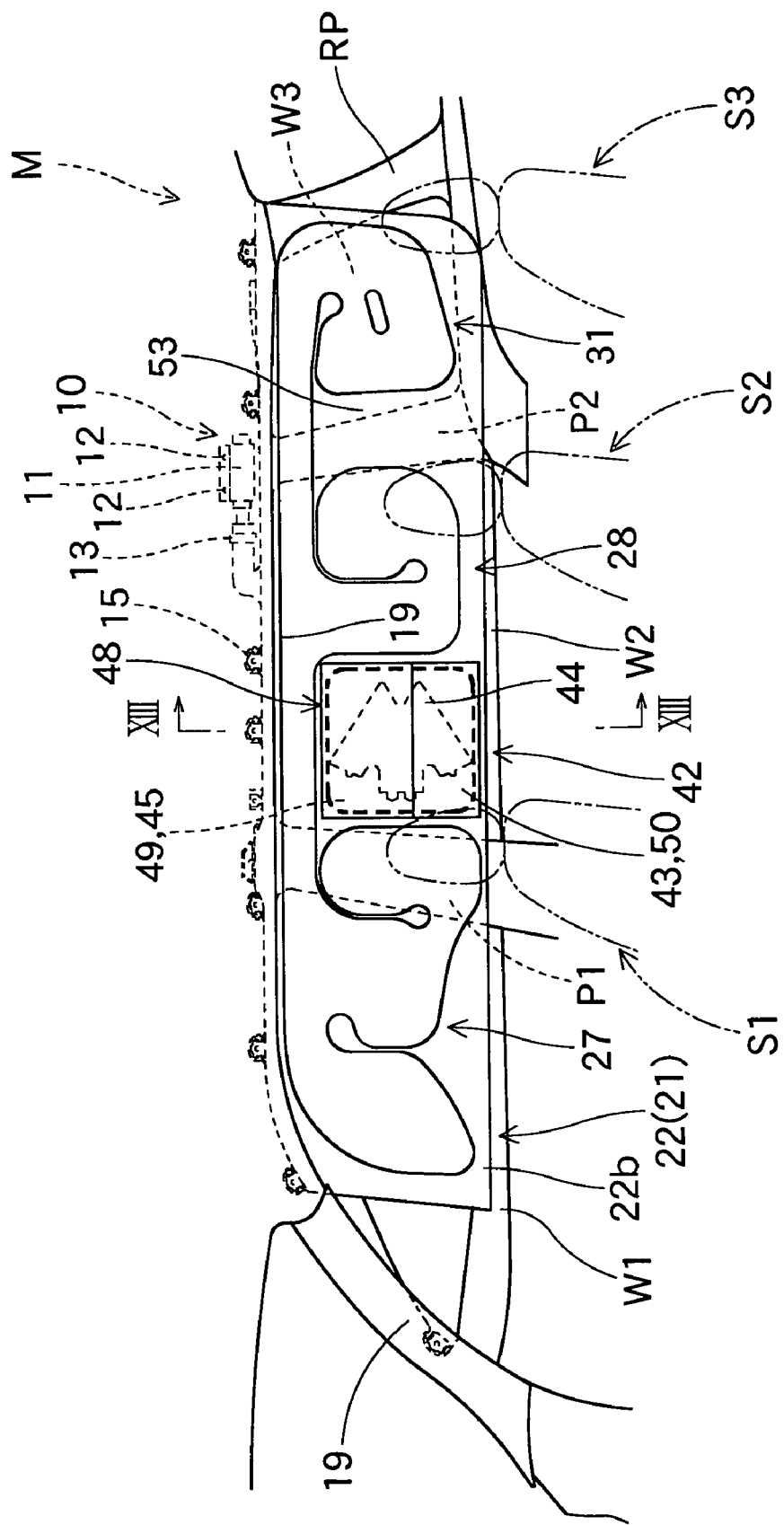
FIG. 12 is a schematic front elevation view seen from the vehicle interior side, showing the airbag when inflation is completed in the head protection airbag device of the embodiment.

The first head protection portion 27 is arranged to the side of the seat S1 of the first row at the completion of inflation of the airbag 21. Specifically, the first head protection portion 27 covers the vehicle interior side of the first intermediate pillar portion P1 arranged at the rear of the window W1 and the vehicle interior side of the window W1 except the front end area thereof upon complete inflation of the airbag 21. The second head protection portion 28 is arranged at the side of the seat S2 of the second row at the time of the completion of the inflation of the airbag 21. Specifically, the second head protection portion 28 covers the vehicle interior side of the rear-half of the window W2 upon complete inflation of the airbag 21 as shown in FIG. 12. The third head protection portion 31 is arranged at the side of the seat S3 of the third row upon complete inflation of the airbag 21. Specifically, the third head protection portion 31 covers the vehicle interior side of almost the whole window W3, leaving only the vicinity of the front end, upon complete inflation of the airbag 21 as shown in FIG. 12.

In the case of the embodiment, the ranges of expansion of the respective first head protection portion 27 and the second head protection portion 28 are divided by thickness control portions 38 which are described later. Plural vertical inflating portions 29 arranged in the up-down (vertical) direction are provided to the front and rear of both the first head protection portion 27 and the second head protection portion 28, in parallel. In the embodiment, the first head protection portion 27 includes three vertical inflating portions 29A, 29B and 29C. The second head protection portion 28 includes two vertical inflating portions 29D and 29E. In the first head protection portion 27, the vertical inflating portion 29A is connected to the gas-supply route portion 24 at its upper end, and the lower end side is blocked. The vertical inflating portion 29B is connected to the gas-supply route portion 24 at its upper end. The lower end of the vertical inflating portion 29B is connected at its rear side to the adjacent vertical inflating portion 29C. The vertical inflating portion 29C has a configuration in which the upper end is blocked and inflation gas G flows in only from the lower end connected to the vertical inflating portion 29B. In the second head protection portion 28, the vertical inflating portion 29D is connected to the gas-supply route portion 24 at its upper end. The lower end of the vertical inflating portion 29D is connected at its rear side to the adjacent vertical inflating portion 29E. The vertical inflating portion 29E has a configuration in which the upper end is blocked and inflation gas G flows in only from the lower end connected to the vertical inflating portion 29D.

The range of the third head protection portion 31 is divided by a later-described thickness control portion 39. Specifically, two lateral inflating portions 32A, 32B arranged in parallel in the front-rear direction are provided one over the other in the third head protection portion 31. The lateral inflating portion 32A arranged at the upper side is connected to the gas-supply route portion 24 at its rear end. The lateral inflating portions 32A, 32B are mutually connected at both the front and rear ends.

The non-inflating portion 35 is structured to connect vehicle-interior wall 23a and vehicle-exterior wall 23b. The non-inflating portion 35 includes a peripheral edge portion 36, fixing portions 37, thickness control portions 38, 39, dividing portions 40 and blocking portions 42, 53 in the embodiment. The peripheral edge portion 36 is provided at a portion of an outer peripheral edge of the bag main body 22 and formed so as to surround the inflating portion 23.

The fixing portions 37 are formed so as to project upward from the peripheral edge portion 36 in the side of the upper edge 22a of the bag main body 22. In the embodiment, the fixing portions 37 are arranged at eight points including the front end of a later-described connecting cloth 55 (refer to FIG. 2 and FIG. 6). A fixing hole 37a to which a bolt 16 is inserted is formed at each fixing portion 37. The fixing bracket 15 is fixed to each fixing portion 37 to fix the fixing portion 37 to the inner panel 2 as described above. Each fixing portion 37 is fixed to the inner panel 2 by the fixing bolt 16 inserted in each fixing hole 37a and screwed to the nut 2b (refer to FIG. 10).

The thickness control portions 38 are formed in ranges of the first head protection portion 27 and the second head protection portion 28. The thickness control portions 38 have the configuration of a line roughly in the up-down direction. Specifically, the thick control portions 38 are arranged at three spots, namely, two spots aligned in the vehicular front-rear direction in the first head protection portion 27 and one spot in the second head protection portion 28. A thickness control portion 38A arranged at the front of the range of the first head protection portion 27 separates the vertical inflating portions 29A and 29B. The thickness control portion 38A is arranged so as to extend upward from the lower edge side of the peripheral edge portion 36. A thickness control portion 38B arranged at the rear of the range of the first head protection portion 27 separates the vertical inflating portions 29B and 29C. The thickness control portion 38B is arranged so as to extend downward from the front end of a later-described dividing portion 40A. A thickness control portion 38C arranged in the range of the second head protection portion 28 separates the vertical inflating portions 29D and 29E. The thickness control portion 38C is arranged so as to extend downward from the front end of a later-described portion 40B. The thickness control portion 39 is arranged in the range of the third head protection portion 31. The thickness control portion 39 has the configuration of a line roughly in the vehicular front-rear direction, arranged so as to separate the lateral inflating portions 32A and 32B.

The dividing portions 40 are formed so as to extend from the upper edge of the blocking portions 42, 53 aligned in the vehicular front-rear direction. The dividing portions 40 separate the gas-supply route portion 24 from parts of the first head protection portion 27, the second head protection portion 28 and the third head protection portion 31 from each other. Specifically, the dividing portions 40 are arranged at three spots extending from the front upper edge of the blocking portion 42, and from front upper edge and front-rear edge of the blocking portion 53. The dividing portion 40A extends forward from the front upper edge side of the blocking portion 42 to be connected to the thickness control portion 38B. The dividing portion 40A blocks the upper end side of the vertical inflating portion 29C in the first head protection portion 27. The dividing portion 40B extends forward from the front upper edge side of the blocking portion 53 to be connected to the thickness control portion 38C. The dividing portion 40B blocks the upper end side of the vertical inflating portion 29E in the second head protection portion 28. The dividing portion 40C extends rearward from the rear upper edge side of the blocking portion 53 above the third head protection portion 31.

The blocking portion 42 is arranged between the first head protection portion 27 and the second head protection portion 28 as well as below the gas-supply route portion 24. The blocking portion 42 is arranged to extend upward from the peripheral edge 36 in the lower edge 22b of the bag main body 22. The blocking portion 42 covers the vehicle interior side I at the front half of the window W2 at the completion of inflation of the airbag 21 (refer to FIG. 12). The blocking portion 53 is arranged between the second head protection portion 28 and the third head protection portion 31 as well as below the gas-supply route portion 24. The blocking portion 53 is arranged to extend upward from the peripheral edge 36 in the lower edge 22b of the bag main body 22. The blocking portion 53 covers the vehicle interior side at the intermediate pillar portion P2 and the vehicle interior side in the vicinity of the front end of the window W3 (refer to FIG. 12).

The blocking portion 42 includes a vehicle interior member 43 and a vehicle exterior member 45 which are overlapped at the vehicle inside side I and the vehicle exterior side O, respectively, and connected to each other as shown in FIG. 2 to FIG. 5. The blocking portion 42 has a sub-portion by the upper edge 43a of the vehicle interior member 43 which is made a downward movement inhibiting portion 44. The downward movement inhibiting portion 44 catches a head H and inhibits the downward movement of the head H when the head H of a passenger P moves downward while moving towards the vehicle exterior side O and then touches the blocking portion 42 after the completion of inflation of the airbag 21 (refer to FIG. 13). Specifically, the blocking portion 42 in the embodiment includes a body side portion 47 and a covering member 48 arranged at the vehicle interior side I of the body side portion 47. The body side portion 47 comprises a non-inflating portion 35 integrally formed with the bag main body 22. The covering member 48 is not part of the bag main body 22.

A cutout portion 47a is cut out from the body side portion 47. The cutout portion 47a is cut out so as to form an inner tube material 59 which is made into an inner tube 58. The cutout portion 47a is cut out through to the vehicle exterior so as to form an opening (refer to FIG. 6). In the case of the embodiment, the cutout portion 47a has its outer edge shape coincident to the outer shape of the inner tube material 59 reversed in the front-rear direction and rotated about its upper edge can be aligned in the front-rear direction of the bag main body 22. The covering member 48 is formed by woven cloth having flexibility made of polyester thread, polyamide thread and the like. The covering member 48 has an almost rectangular as well as has a shape such that a portion in the vicinity of the lower edge is folded back into the vehicle interior side as shown in FIG. 2 and FIG. 6. The covering member 48 includes a vehicle exterior portion 49 facing the vehicle exterior side O and a vehicle interior portion 50 arranged folded toward the vehicle interior side "I". The vehicle exterior portion 49 has a size which can cover the cutout portion 47a. The peripheral edge of the covering member 48 in the state in which the vehicle interior portion 50 is folded back to the vehicle interior side I is stitched to the whole peripheral edge portion 47b of the cutout portion 47a in the body side portion 47 except at the upper edge 50a of the vehicle interior portion 50. Specifically, the covering member 48 is stitched to the peripheral edge portion 47b of the cutout portion 47a at the sewing line 51. In the case of the embodiment, the upper edge 50a of the vehicle interior portion 50 is arranged at a position higher than the lower edge of the window W2 but lower than the central position in the up-down direction of the bag main body 22 upon complete inflation of the airbag 21 (refer to FIG. 12). Specifically, the upper edge 50a of the vehicle interior portion 50 is arranged at a position approximately ⅓ of the up-down length measured from the lower edge 22b of the bag main body 22. In the case of the embodiment, the covering member 48 is made of non-coated cloth on which a coating agent is not coated.

In the embodiment, the peripheral edge portion 47b forming the periphery of the cutout portion 47a in the body side portion 47 and the vehicle exterior portion 49 of the covering member 48 form the vehicle exterior member 45 in the blocking portion 42. Also in the embodiment, the vehicle interior portion 50 in the covering member 48 comprises the vehicle interior member 43 of the blocking portion 42. The portion which is the inner side of the sewing line 51 in the vehicle interior portion 50 forms the downward movement inhibiting portion 44. Specifically, the front-rear peripheral portions (front-rear peripheral portions 50b, 50c of the vehicle interior portion 50) of the downward movement inhibiting portion 44 are stitched to the vehicle exterior member 45 (peripheral edge portion 47b of the body side portion 47 and the vehicle exterior portion 49 of the covering member 48) by the sewing line 51. The lower edge portion (lower edge 50d of the vehicle interior portion 50) of the downward movement inhibiting portion 44 is also stitched to the vehicle exterior member 45 (peripheral edge portion 47b of the body side portion 47 and the vehicle exterior portion 49 of the covering member 48). The downward movement inhibiting portion 44 takes the upper edge 50a which is arranged at a position higher than the lower edge of the window W2 but lower than the vertical (up-down) center of the bag main body 22 as a catching edge 44a. When the catching edge 44a catches the head H of the passenger P which is moving downward while moving toward the vehicle exterior side O, catching edge 44a is separated from the vehicle exterior member 45 so as to inhibit the downward movement of the head H upon complete inflation of the airbag 21, as shown by chain double-dashed lines of FIG. 13. The downward movement inhibiting portion 44 (vehicle interior portion 50) up-down (vertical) length is set to be at least 10 mm (preferably 50 mm or more, further preferably 100 mm or more). In the embodiment, the up-down length of downward movement inhibiting portion 44 corresponds to the interval "t1" (refer to FIG. 4) between the sewing line 51 and the upper edge 50a in the vehicle interior portion 50. If the up-down width dimension "t1" of the downward movement inhibiting portion 44 is less than 10 mm the case may occur in which it is difficult to maintain the engaged state of the head H and to reliably catch the head H of the passenger P when the head H of the passenger P abuts on the portion from above. When the up-down width dimension "t1" of the downward movement inhibiting portion 44 exceeds 10 mm, it is possible to catch the head H of the passenger P. However, it is preferable that the up-down length "t1" of the downward movement inhibiting portion 44 is set to 50 mm or more in order to reliably catch the head H of the passenger P.

The non-inflating portion 35 includes the connecting cloth 55 arranged at the front edge of the bag main body 22. The connecting cloth 55 is formed by woven cloth having flexibility made of polyester thread, polyamide thread or the like, like the covering member 48. The connecting cloth 55 is connected to the vicinity of the front edge of the bag main body 22 by being stitched thereto. The connecting cloth 55 is arranged near the lower part of the front pillar portion FP when inflation is completed. A fixing portion 37 is formed also at the tip of the connecting cloth 55.

The inner tube 58 is made of the inner tube material 59 formed by cutting the body side portion 47 of the bag main body 22 as described above. The inner tube 58 is arranged inside the bag main body 22 from the gas-inflow port 25 to the portion of the gas supply route portion 24 near the gas-inflow port 25 as shown in FIG. 2. The inner tube 58 opens at its rear end so that the inflator 10 can be inserted thereto. The inner tube 58 opens also at both the front and rear sides of the portion to be arranged in the gas-supply route portion 24. In the embodiment, the inner tube 58 is formed by folding the inner tube material 59 which is the shape connected at the upper edge side as shown in FIG. 6 and stitching the lower edge side and the rear edge side except at the opening portions.

Figures 7A, 7B, 7C:
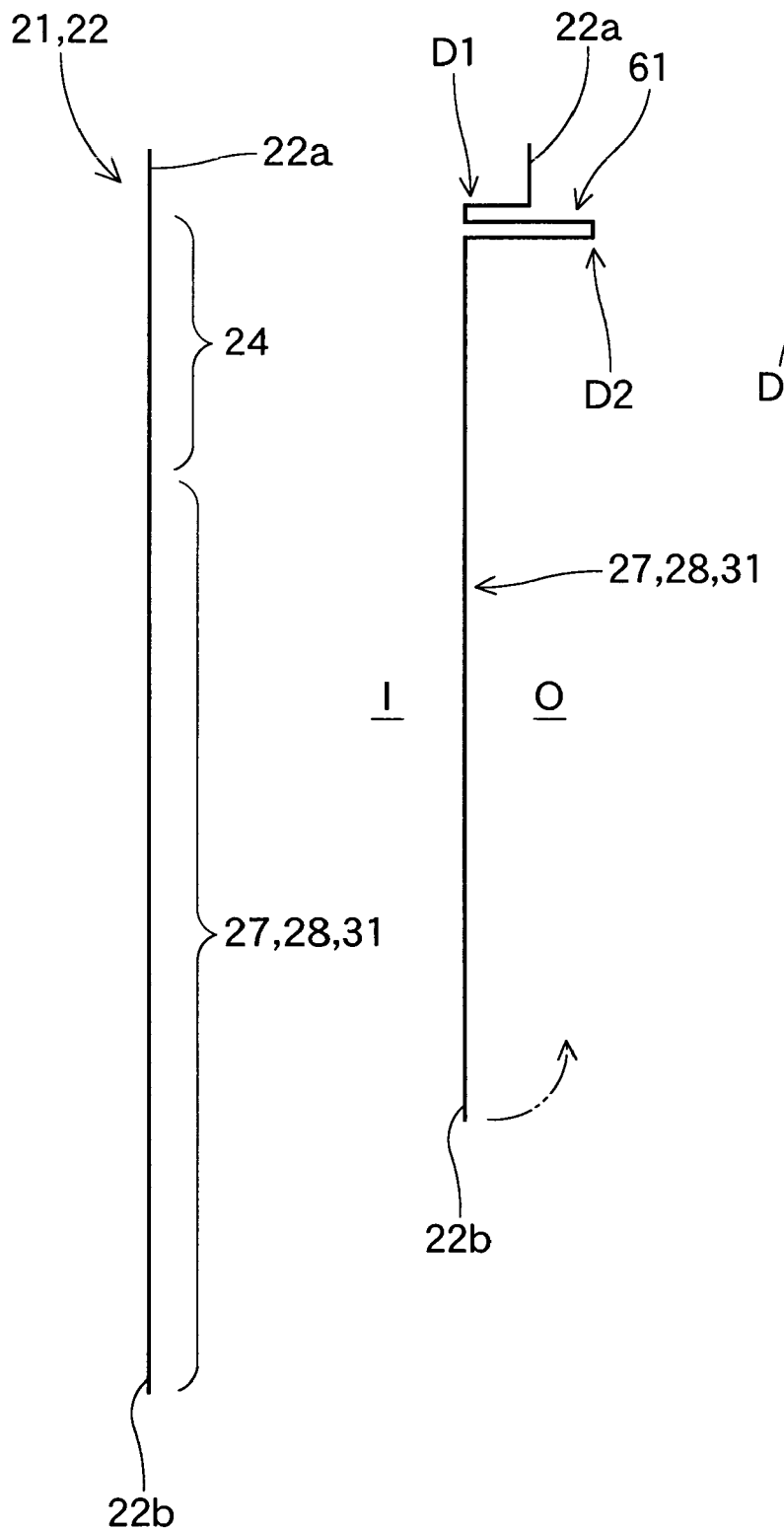
FIG. 7A to FIG. 7C are views explaining folding processes of the airbag of the embodiment.

Next, the mounting the airbag device M of the embodiment on the vehicle V will be explained. First, the airbag 21 in which the covering member 48 and the connecting cloth 55 are stitched and the inner tube 58 is housed in advance is folded. Specifically, the airbag 21 is deployed in a flat state with the vehicle-interior wall 23a overlapping the vehicle-exterior wall 23b. After that, as shown in FIG. 7A and FIG. 7B, the portion of the gas-supply route portion 24 by the upper edge 22a in the airbag 21 is bellows-folded so as to overlap in the up-down direction, making creases D1, D2 sequentially to form a bellows folding portion 61. After that, as shown in FIG. 7C, the portion at the lower side of the bellows folding portion 61 in the airbag 21 (the first head protection portion 27, the second head protection portion 28 and the third head protection portion 31) is rolled with the lower edge 22b of the airbag 21 directed to the vehicle exterior side O to form a roll folding portion 62. In this way, the folding operation of the airbag 21 can be completed. When folding of the airbag 21 is completed, the airbag 21 is wrapped by a not-shown breakable wrapping material for preventing deformation of the folded configuration. Next, the fixing brackets 15 are arranged to the respective fixing portions 37 of the airbag 21. The inflator 10 is connected to the gas-inflow port 25 of the airbag 21 with the clamp 13. Then, the fixing bracket 11 is arranged around the inflator 10. Also, the guide brackets 17F, 17B are arranged around the airbag 21. At this time, the upper end 17d of the vertical wall portion 17a in the guide brackets 17F, 17B is aligned with the upper edge 22a in the airbag 21. Then, the guide brackets 17F, 17B are integrally connected to the airbag by winding the tape material T for assembly around the guide brackets 17F, 17B, thus configuring the airbag assembly for installation.

After that, respective fixing brackets 11, 15 and guide brackets 17F, 17B are arranged at specified positions of the inner panel 2 and fastened by bolts 12, 16 and 18 to fix the airbag assembly to the body 1. Next, a not-shown lead wire extending from a given control device for operating the inflator is connected to the inflator 10. The pillar garnish 4 and the roof head lining 5 are fixed to the body 1. Also, the pillar garnishes 6, 7 and 8 are fixed to the body 1, thus mounting the airbag device M on the vehicle V.

After the airbag device M is mounted on the vehicle V, when the inflator 10 is operated, inflation gas G from the inflator 10 flows in the bag main body 22 of the airbag 21. The airbag 21 breaks the not-shown wrapping material, push-opens the airbag cover 19 comprising the lower edges of the pillar garnish 4 and the roof head lining 5, and projects downward. After that, the airbag 21 inflates greatly so as to cover the vehicle interior side of the windows W1, W2 and W3, the first intermediate pillar portion P1, the second intermediate pillar P2 and the rear pillar portion RP as shown by chain double-dashed lines of FIG. 1, FIG. 12 and FIG. 13.

Figure 13:
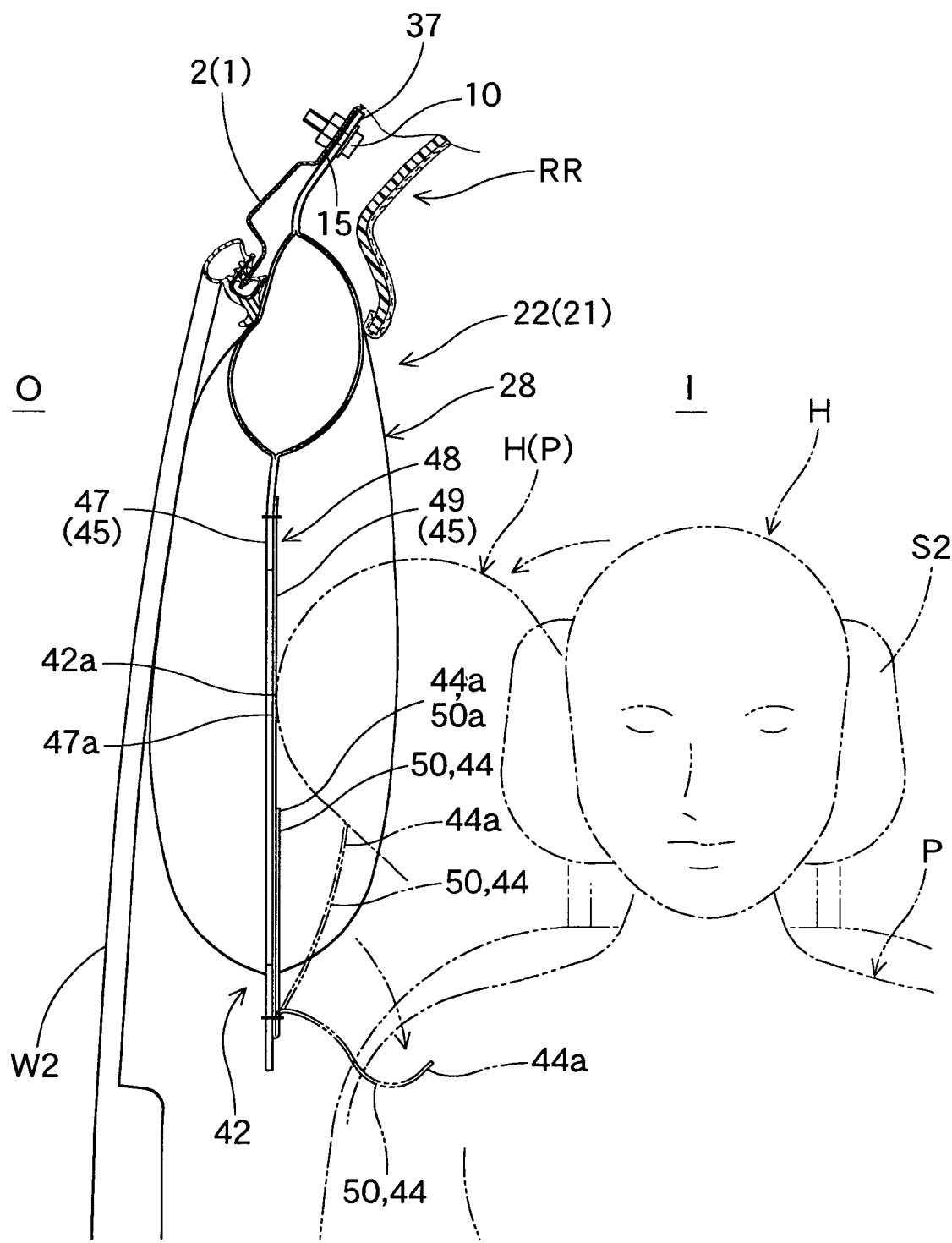
FIG. 13 is a cross-sectional view showing the airbag when inflation is completed in the head protection airbag device of the embodiment, along the line XIII-XIII in FIG. 12.

In the airbag device M in the embodiment, the downward movement inhibiting portion 44 is arranged at the blocking portion 42 in the airbag 21 upon completion of inflation. The downward movement inhibiting portion 44 catches the head H and inhibits the downward movement of the head H, when the head H of the passenger P moves downward while moving towards the vehicle exterior side O and touches the blocking portion 42. In the case of the embodiment, specifically, when the head H of the passenger P moves downward so as to abut on the blocking portion 42 of the inflated airbag 21, the downward movement inhibiting portion 44 catches the head H so that the catching edge 44a arranged at the upper edge side of the downward movement inhibiting portion 44 is separated from the vehicle exterior member 45 as shown by chain double-dashed lines of FIG. 13. Accordingly, in the airbag device M of the embodiment, the head H of the passenger P abutting on the blocking portion 42 can be inhibited from moving downward by catching the head by the catching edge 44a of the downward movement inhibiting portion 44. Specifically, the airbag device M of the embodiment can reliably prevent the head H of the passenger P from moving downward lower than the downward movement inhibiting portion 44. As a result, it is also possible to prevent the head H of the passenger P from slipping out from the lower edge side of the blocking portion 42 and passing through to the vehicle exterior side O. In addition, in the airbag device M of the embodiment, the downward movement inhibiting portion 44 is arranged at a position higher than the lower edge of the window W2 but lower than the center of the airbag 21 in the up-down direction upon complete inflation of the airbag 21. Therefore, when the head H of the passenger P abuts on the blocking portion 42 at the time of the completion of inflation of the airbag 21, the downward movement inhibiting portion 44 is positioned lower than the head H. Specifically, the downward movement inhibiting portion 44 is formed at a position lower than a portion 42a at which the head H of the passenger P moving toward the vehicle exterior O abuts on the blocking portion 42 as shown in FIG. 13. As a result, it is possible to reliably catch the head H of the passenger P with the downward movement inhibiting portion 44.

Therefore, in the airbag device M of the embodiment, it is possible to reliably arrest the head H of the passenger P and to prevent the downward movement of the head H even at an area of the blocking portion 42 into which inflation gas does not flow.

Additionally, in the airbag device M of the embodiment, the airbag 21 is manufactured by a hollow weave. Also, in the airbag device M of the embodiment, the body side portion 47 which is the portion of the non-inflating portion 35 forming the blocking portion 42 is cut out so as to be converted to another member. Specifically, in the embodiment, the body side portion 47 is cut out and used as inner tube material 59 to make the inner tube 58. Therefore, in the airbag device M in the embodiment, it is possible to manufacture the inner tube 58 arranged at the gas-inflow port 25 of the airbag 21 at the same time as the manufacture of the airbag 21. In addition, in the airbag device M in the embodiment, the covering member 48 covering the cutout portion 47a is made of non-coated cloth. Therefore, it is possible to decrease manufacturing costs of the airbag 21. Furthermore, in the airbag device M of the embodiment, the covering member 48 is arranged so as to cover the vehicle interior side I of the cutout portion 47a. Therefore, the downward movement inhibiting portion 44 can be formed from the vehicle inside portion 50 of the covering member 48 only by setting the dimensions of the covering member 48 much larger than necessary to cover the cutout portion 47a, a preferable configuration. If the covering member were arranged so as to cover the vehicle exterior side of the cutout portion, the downward movement inhibiting portion would be the cutout portion. In such case, the downward movement inhibiting portion would be affected by design change because the shape of the cutout portion varies according to the design. When the configuration in which the covering member covers the vehicle interior side of the cutout portion is applied as in the present embodiment, the downward movement inhibiting portion is not affected by such design change. It goes without saying that the block member can be arranged so as to cover the vehicle exterior side of the cutout portion as described later if this point is not considered.

The inner tube 58 is a member for protecting the portion of the airbag near the gas-inflow port 25 as well as securing strength in the vicinity of the gas-inflow port 25. The inner tube 58 is a necessary member in an airbag 21 having large capacity which is mounted on the vehicle V of three-row seat type as in the embodiment, and is usually arranged inside the gas inflow port in an airbag device for protecting the head. Particularly, in the airbag device M of the embodiment, the bag main body 22 is formed from coated cloth, a coating agent such as silicon being coated over the whole surface. Therefore, the coating agent is also coated on the outer surface of the inner tube material 59 forming the inner tube 58. As a result, the inner tube material 59 itself has the heat resistance necessary for the inner tube and can be used without trouble when it is used as the inner tube as is.

If the above points are not considered, it is possible to use a configuration not having a cutout portion cut out of the blocking portion. For example, it is possible that the portion in the non-inflating portion forming the blocking portion is used as the vehicle exterior member. In this case, a separate cloth material is arranged at the vehicle interior side of the non-inflating portion forming the blocking portion as the vehicle interior member (downward movement inhibiting portion) and at least the front-rear edge sides are connected to the blocking portion. It is more preferable that an extending portion extending downward from the non-inflating portion forming the blocking portion is integrally woven with the bag main body. In this case, the extending portion is folded at the lower edge side of the bag main body to be on the vehicle interior side, connected to the non-inflating portion forming the blocking portion at the front-rear edge sides, thereby forming the vehicle interior member (downward movement inhibiting portion) from the extending portion.

Furthermore, in the airbag device M of the embodiment, the one continuous covering member 48 comprises the vehicle exterior portion 49 and the vehicle interior portion 50, with the vehicle interior portion 50 folded back toward the vehicle interior. Specifically, in the embodiment, the lower edge side of the vehicle interior portion 50 (vehicle interior member 43) forming the downward movement inhibiting portion 44 is connected to the vehicle exterior portion 49 (vehicle exterior member 45). Therefore, in the embodiment, when the head H of the passenger P abuts on the downward movement inhibiting portion 44 from above while abutting on the blocking portion 42, the catching edge 44a of the downward movement inhibiting portion 44 moves downward while bending to the vehicle interior side I as shown by the chain double-dashed lines of FIG. 13. That is, in the embodiment, when the head H abuts on the downward movement inhibiting portion 44 from above, the downward movement inhibiting portion 44 opens up toward the vehicle interior I. Accordingly, the vehicle interior side I of the window W2 can be widely covered by the opened downward movement inhibiting portion 44. Specifically, in the embodiment, the vehicle interior portion 50 (vehicle interior member 43) forming the downward movement inhibiting portion 44 has a pocket shape in which the lower edge side is connected to the vehicle exterior portion 49 (vehicle exterior member 45). Therefore, when the head H of the passenger P moves in such a manner that the head H enters between the vehicle interior portion 50 and the vehicle exterior portion 49 when inflation of the airbag 21 is completed, the vehicle exterior side of the head H can be reliably covered, by the vehicle exterior portion 49 or the vehicle interior portion 50. That is, in the embodiment, the vehicle exterior portion 49 or the vehicle interior portion 50 is interposed between the head H and the window W2 upon complete inflation of the airbag 21. Accordingly, the head H of the passenger P can be suitably protected from the window W2 at the time of rollover, a preferable configuration. Moreover, in the embodiment, the vehicle exterior portion 49 and the vehicle interior portion 50 are formed from one continuous member. Accordingly, a connecting operation connecting the lower edge side of the vehicle interior portion to the vehicle exterior portion becomes unnecessary, which further decreases manufacturing man-hours. It goes without saying that a covering member comprising a vehicle exterior portion and vehicle interior portion formed separately can be used if the above point is not considered.

Figure 14:
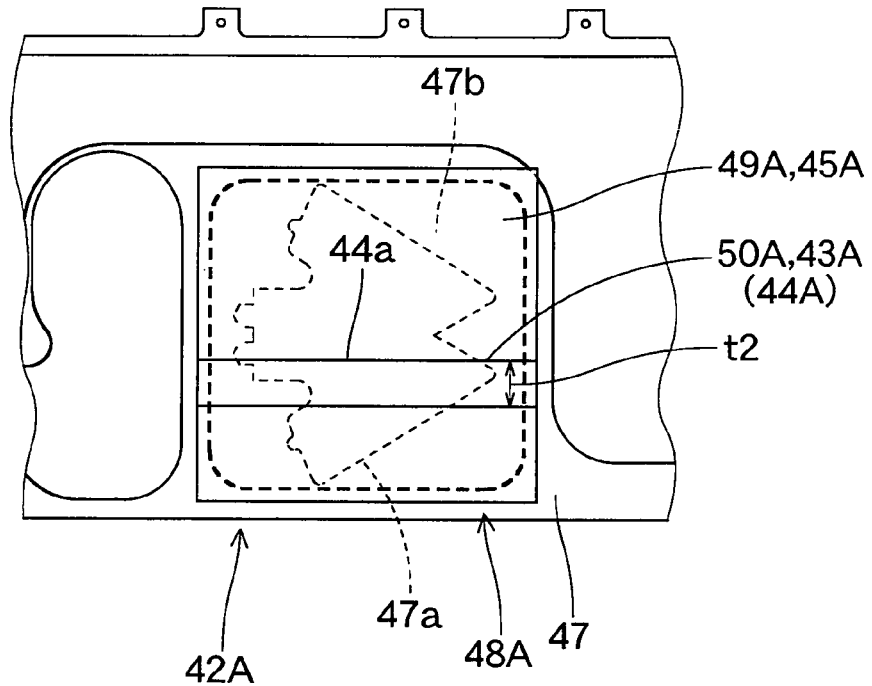
FIG. 14 is an enlarged front elevation view of an alternative example of the blocking portion in the airbag used in the head protection airbag device of the embodiment.

Furthermore, a blocking portion 42A formed as shown in FIG. 14 is acceptable. In the blocking portion 42A of FIG. 14, a vehicle interior portion 50A which is part of covering member 48A has a band shape separated from the vehicle exterior portion 49A. Specifically, the vehicle interior portion 50A is separated from the vehicle exterior portion 49A at its lower edge, and is stitched to the vehicle exterior portion 49A only at its vehicular front and rear edges. Also, in this covering member 48A, the vehicle interior portion 50A serving as a downward movement inhibiting portion 44A is set so that the up-down width "t2" (refer to FIG. 14) is at least 10 mm or more. In the blocking portion 42A having the above configuration, the length of the connection between the vehicle interior portion 50A (vehicle interior member 43A) and the vehicle exterior portion 49A (vehicle exterior member 45A) can be shortened as compared with the case in which the vehicle interior member separated from the vehicle exterior member is connected to the vehicle exterior member at both the front and rear edges and also the lower edge. This is because the vehicle interior portion 50A (vehicle interior member 43A) is connected to the vehicle exterior portion 49A (vehicle exterior member 45A) only at the front and rear edges. Therefore, it is possible to further decrease manufacturing costs of the airbag.

Figure 15:
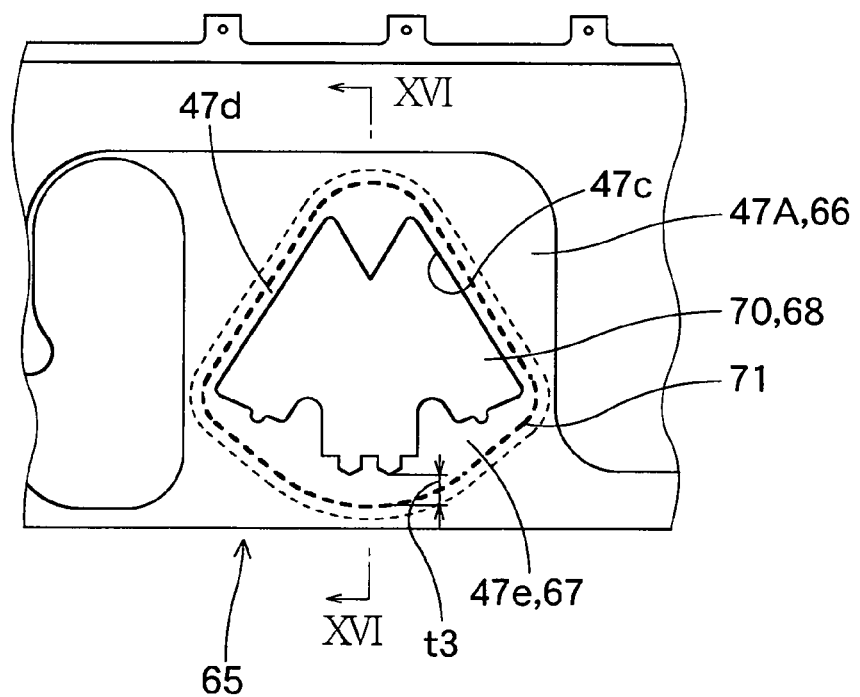
FIG. 15 is an enlarged front elevation view of another alternative example of a part of the airbag used in the head protection airbag device of the embodiment.
Figure 16:
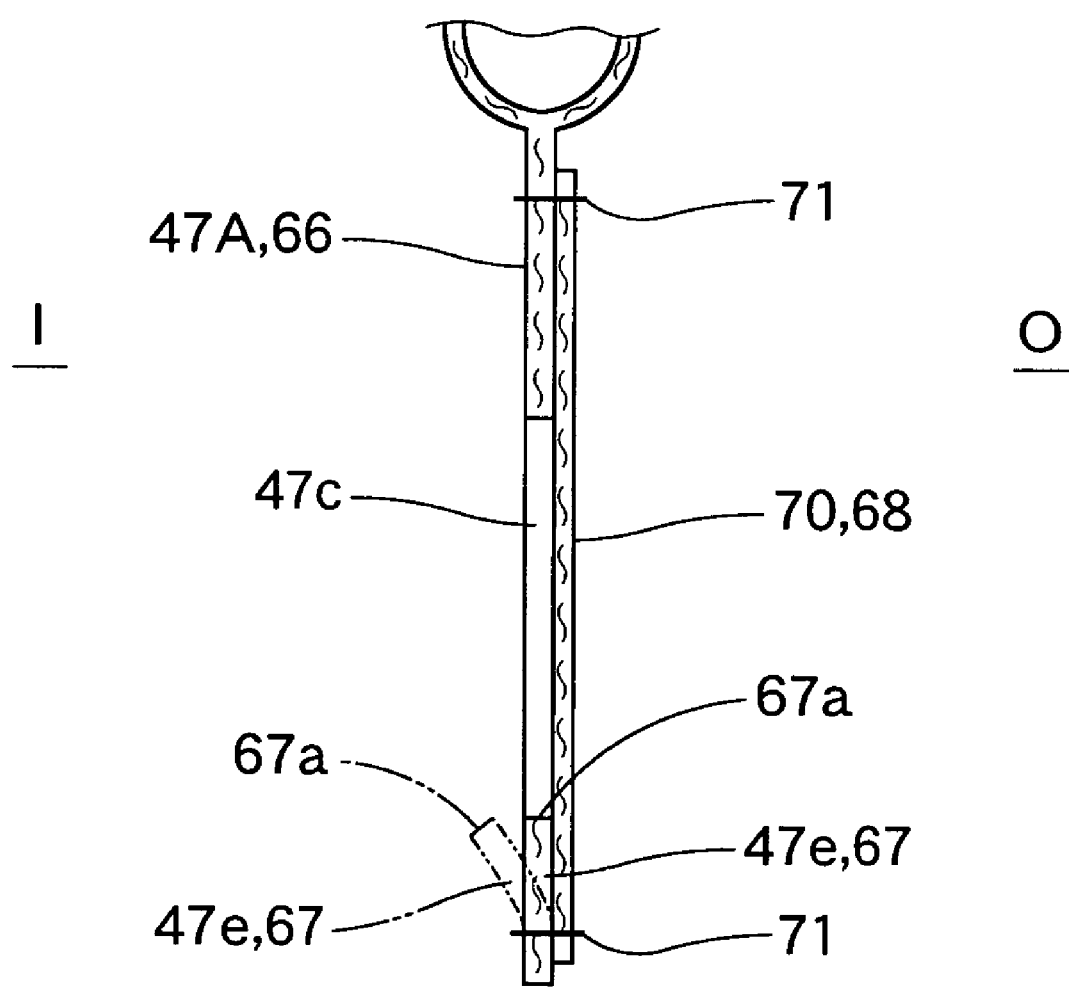
FIG. 16 is a cross-sectional view along the line XVI-XVI of FIG. 15.

In the embodiment, in the blocking portion 42 of the airbag 21, the body side portion 47 is part of the vehicle exterior member 45. It is also acceptable that a blocking portion 65 has a configuration as shown in FIG. 15 and FIG. 16. In the blocking portion 65, a body side portion 47A comprises a vehicle interior member 66. From the body side portion 47A, the inner tube material is cut out so as to pierce through to the vehicle interior and exterior. Then, a covering member 70 is arranged so as to cover the cutout portion 47c of the body side portion 47A from the vehicle exterior side 0. The covering member 70 is stitched to the body side portion 47A over the whole periphery around the cutout portion 47c. In this case, the covering member 70 is to be the vehicle exterior member 68. In the blocking portion 65, a lower-edge side portion 47e in a peripheral edge portion 47d of the cutout portion 47c forms a downward movement inhibiting portion 67. The cutout portion 47c has the shape of the inner tube, its front-rear direction corresponding to the up-down direction of the blocking portion so that the rear end of the inner tube when mounted on a vehicle is toward the bottom of the blocking portion. Specifically, the cutout portion 47c has an opening shape approaching a trapezoidal shape whose bottom is positioned at the lower edge side as shown in FIG. 15. The body side portion 47A is stitched to the covering member 70 at a sewing line 71 formed over the whole periphery of the cutout portion 47c. The sewing line 71 is formed so that the distance from it to the lower edge side 47e of the cutout portion 47c is 10 mm or more (preferably 20 mm or more). That is, also in the blocking portion 65, the downward movement inhibiting portion 67 stitched to the vehicle exterior member 45A at both the front and rear edge sides and at the lower edge side is set so that the width in the up-down direction "t3" (refer to FIG. 15) is 10 mm or more (preferably 20 mm or more). Therefore, the downward movement inhibiting portion 67 can reliably catch the head of the passenger moving downward at the catching edge 67a at the upper edge side of the downward movement inhibiting portion 67. Further, in the blocking portion 65 as well, the downward movement inhibiting portion 67 is arranged at a position higher than the lower edge of the window but lower than the center of the airbag in the up-down direction at the time of the completion of inflation.

In the blocking portion 65 having the above configuration, it is possible to set the covering member 70 to the size which can just cover the cutout portion 47c. That is because the downward movement inhibiting portion 67 is formed from the lower edge side portion 47e which is a periphery of the cutout portion 47c cut out from the body side portion 47A which is a portion of the non-inflating portion 35. Therefore, the covering member 70 can be small in size as compared with the above covering portion 42. In addition, the number of overlappings in the folding can be decreased as compared with the above blocking portion 42. As a result, it is possible to reduce weight and make the folding compact.

In FIG. 15 and FIG. 16, the body side portion 47A having the thickness of two walls formed by connecting the vehicle interior wall and the vehicle exterior wall is cut out so as to be pierce through to the vehicle interior and exterior, the cut out portion converted to the inner tube material. For example, it is also acceptable that a portion including the inner tube material and a peripheral portion thereof of the body side portion is manufactured so that the vehicle interior wall is separated from the vehicle exterior wall when the bag main body is woven-made. In this case, the blocking portion is formed from two walls, a vehicle interior wall and a vehicle exterior wall. In addition, it is also possible to cut out only the portion of the vehicle interior wall and convert this to the inner tube material in this case. In this configuration, a portion of the cutout peripheral edge portion of the vehicle interior wall is made a vehicle interior member. The cutout lower edge portion forms the downward movement inhibiting portion. Further, a vehicle exterior wall in the body side portion is made a vehicle exterior member. Therefore, the arrangement of a separate covering material and the sewing of the covering member are unnecessary. As a result, manufacturing man-hours of the airbag can be decreased.

In the embodiments, explanations have been made by taking the inner tube as an example of a member made by cutting out the body side portions 47, 47A in the blocking portions 42, 65. However, the invention is not limited to this, and another member can be made from a cut out portion of the body side portion. For example, it is preferable that a portion having a bag shape of small capacity is integrally on a portion of the blocking portion with the bag main body, this portion being cut out to be used for another airbag protecting another area of the vehicle.

Moreover, in the embodiments, the hollow-woven airbag has been taken as an example and explained. However, the invention can be applied to an airbag of a stitched-together type in which base cloth having a set shape is made into the airbag by stitching.

Furthermore, the head protection airbag device M mounted on a three-row seat type vehicle has been taken as an example and explained. However, the invention can be applied to a head protection airbag device to be mounted on a two-row seat type vehicle when the device uses an airbag containing two head protection portions.

What is claimed is:

1. A head protection airbag device, comprising;

an airbag folded and housed at the upper edge of windows on the vehicle interior side; and an inflator supplying inflation gas to the airbag, and wherein the upper edge of the airbag is installed on and fixed to the vehicle body, and the airbag is configured to deploy and inflate so as to cover the vehicle interior side of the windows while projecting downward from the position in which the airbag is housed by allowing inflation gas from the inflator to flow therein, wherein the airbag includes an inflating portion which inflates by allowing inflation gas to flow therein, and a non-inflating portion into which the inflation gas does not flow, wherein the inflating portion has plural head protection portions provided at the sides of the seats and aligned in the vehicular front-rear direction, which protect passengers' heads when inflation is completed, wherein the non-inflating portion includes blocking portions extending from the lower edge toward the upper edge of the airbag between the head protection portions and covering the vehicle interior side of the windows at the completion of inflation of the airbag, wherein at a blocking portion a downward movement inhibiting portion is formed which catches the passenger's head and inhibits downward movement of the head when the head moves downward while moving toward the vehicle exterior and touches the blocking portion, at the completion of inflation of the airbag, wherein the blocking portion comprises sheets of flexible material overlapping each other at the vehicle interior side and the vehicle exterior side and mutually connected, and configuring a portion near the upper edge of a vehicle interior member arranged at the vehicle interior to be the downward movement inhibiting portion, wherein the downward movement inhibiting portion is connected at both its front and rear edges to a vehicle exterior member of the blocking portion arranged facing the vehicle exterior, the downward movement inhibiting portion arranged at a position higher than the lower edge of the window but lower than the center of the airbag in the up-down direction when inflation of the airbag is completed, and wherein the upper edge of the downward movement inhibiting portion is made to be a catching edge which can be separated from the side of the vehicle exterior member at the time it catches the head.

2. The head protection airbag device according to claim 1, wherein the airbag is manufactured with a hollow weave, and a portion of the non-inflating portion forming the blocking portion is cut out so as to be used to make another member, and wherein a separate covering member formed from a sheet material having flexibility and covering the cutout portion cut out from the non-inflating portion is arranged so as to cover the cutout portion and is connected to the periphery of the cutout portion and wherein the covering member includes a vehicle exterior portion comprising the vehicle exterior member and a vehicle interior portion comprising the vehicle interior member.

3. The head protection airbag device according to claim 2, wherein the covering member is arranged so as to cover the vehicle interior side of the cutout portion.

4. The head protection airbag device according to claim 1, wherein the vehicle interior member forming the downward movement inhibiting portion is connected, at the lower edge below the catching edge, to the vehicle exterior member.

5. The head protection airbag device according to claim 1, wherein the vehicle interior member forming the downward movement inhibiting portion is separated from the vehicle exterior member at the lower edge side positioned below the catching edge.

6. The head protection airbag device according to claim 1, wherein the airbag is manufactured with a hollow weave, and a non-inflating portion forming the blocking portion has a portion cut out so as to be used for another member, and wherein the downward movement inhibiting portion comprises a portion at the lower periphery of the cutout portion in the non-inflating portion.

* * * * *